US012695714B2

(12) United States Patent
Lambert

(10) Patent No.: US 12,695,714 B2
(45) Date of Patent: Jul. 28, 2026

(54) GENERATIVE ARTIFICIAL INTELLIGENCE EMAIL CLIENT WITH SENDER CENTRIC CAPABILITIES IN AN IMMERSIVE ENVIRONMENT

(71) Applicant: Mark Lambert, Tarpon Springs, FL (US)

(72) Inventor: Mark Lambert, Tarpon Springs, FL (US)

(73) Assignee: Mark Lambert, Tarpon Springs, FL (US)

( * ) Notice: Subject to any disclaimer, the term of this patent is extended or adjusted under 35 U.S.C. 154(b) by 0 days.

(21) Appl. No.: 18/819,231

(22) Filed: Aug. 29, 2024

(65) Prior Publication Data

US 2025/0274408 A1      Aug. 28, 2025

Related U.S. Application Data

(63) Continuation of application No. 18/585,966, filed on Feb. 23, 2024.

(51) Int. Cl.
H04L 51/02 (2022.01)
G06F 40/20 (2020.01)
G06T 19/00 (2011.01)

(52) U.S. Cl.
CPC .............. H04L 51/02 (2013.01); G06F 40/20 (2020.01); G06T 19/006 (2013.01)

(58) Field of Classification Search
CPC ........ H04L 51/02; G06F 40/20; G06T 19/006
See application file for complete search history.

(56) References Cited

U.S. PATENT DOCUMENTS

| | | | |
|---|---|---|---|
| 6,732,155 | B2 | 5/2004 | Meek |
| 7,219,302 | B1 | 5/2007 | Oshaughnessy et al. |
| 7,413,085 | B2 | 8/2008 | Zager et al. |
| 8,392,409 | B1 | 3/2013 | Kashyap et al. |
| 10,375,003 | B1 | 8/2019 | Olsen et al. |
| 11,138,174 | B2 | 10/2021 | Semenov |
| 11,162,071 | B2 | 11/2021 | Loose et al. |

(Continued)

FOREIGN PATENT DOCUMENTS

| | | |
|---|---|---|
| CN | 1588414 A | 3/2005 |
| DE | 102005041369 B3 | 1/2007 |

(Continued)

OTHER PUBLICATIONS

ISA, International Search Report for International Application No. PCT/US2024/036178, mailed on Oct. 23, 2024, 6 pages.

(Continued)

*Primary Examiner* — Suraj M Joshi
(74) *Attorney, Agent, or Firm* — Perkins Coie LLP; Alberto Araiza

(57)      ABSTRACT

The present technology provides mixed reality methods and systems for enhanced email communication by generating sender-centric responses in an email client. The email client takes sender-specific data and data used to determine the relationship between the sender and receiver. This data is then used as input for a trained receiver-specific generative AI model. The generative AI model generates a custom response for a inbound emails that are displayed in a mixed reality environment of the email client.

25 Claims, 7 Drawing Sheets

(56)        References Cited

U.S. PATENT DOCUMENTS

| | | |
|---|---|---|
| 11,328,265 B1 | 5/2022 | Givoly |
| 11,526,779 B2 | 12/2022 | Bringsjord et al. |
| 11,546,281 B1 | 1/2023 | Brown |
| 11,710,000 B1 | 7/2023 | Cuan |
| 11,777,892 B1 | 10/2023 | Sen et al. |
| 11,947,902 B1 | 4/2024 | Grimshaw et al. |
| 2002/0099719 A1 | 7/2002 | Schwitters et al. |
| 2002/0138581 A1 | 9/2002 | Macintosh et al. |
| 2003/0093483 A1 | 5/2003 | Allen et al. |
| 2003/0135565 A1 | 7/2003 | Estrada |
| 2003/0233419 A1 | 12/2003 | Beringer |
| 2004/0260718 A1 | 12/2004 | Fedorov |
| 2005/0043015 A1 | 2/2005 | Muramatsu |
| 2005/0063365 A1 | 3/2005 | Mathew et al. |
| 2005/0257159 A1 | 11/2005 | Keohane et al. |
| 2005/0267944 A1 | 12/2005 | Little |
| 2006/0072723 A1 | 4/2006 | Chung |
| 2006/0080278 A1 | 4/2006 | Neiditsch et al. |
| 2006/0155810 A1 | 7/2006 | Butcher |
| 2006/0248155 A1 | 11/2006 | Bondarenko et al. |
| 2007/0061400 A1 | 3/2007 | Parsons |
| 2008/0046518 A1 | 2/2008 | Tonnison et al. |
| 2008/0133501 A1 | 6/2008 | Andersen et al. |
| 2008/0147818 A1 | 6/2008 | Sabo |
| 2008/0183824 A1 | 7/2008 | Chen et al. |
| 2008/0235335 A1 | 9/2008 | Hintermeister et al. |
| 2008/0276171 A1 | 11/2008 | Sabo |
| 2010/0271365 A1 | 10/2010 | Smith et al. |
| 2011/0010182 A1 | 1/2011 | Williams et al. |
| 2011/0075665 A1 | 3/2011 | Lederer |
| 2011/0119258 A1 | 5/2011 | Forutanpour et al. |
| 2011/0307804 A1 | 12/2011 | Spierer |
| 2012/0030711 A1 | 2/2012 | Rae et al. |
| 2012/0215866 A1 | 8/2012 | Satterfield et al. |
| 2012/0221961 A1 | 8/2012 | Reynolds |
| 2012/0297300 A1 | 11/2012 | Mahoney et al. |
| 2013/0097121 A1 | 4/2013 | Jung |
| 2013/0227454 A1 | 8/2013 | Thorsander et al. |
| 2015/0012208 A1 | 1/2015 | Abrams |
| 2015/0039566 A1 | 2/2015 | Baumann et al. |
| 2015/0088784 A1 | 3/2015 | Dhara et al. |
| 2015/0195232 A1 | 7/2015 | Haugen et al. |
| 2015/0220786 A1 | 8/2015 | Folkens et al. |
| 2015/0248429 A1 | 9/2015 | Pregueiro et al. |
| 2015/0264004 A1 | 9/2015 | Khoo |
| 2015/0339373 A1 | 11/2015 | Carlson et al. |
| 2016/0011757 A1 | 1/2016 | Hoffman |
| 2016/0026718 A1 | 1/2016 | Hopkins et al. |
| 2016/0119260 A1 | 4/2016 | Ghafourifar et al. |
| 2017/0031770 A1 | 2/2017 | Breedvelt-schouten et al. |
| 2017/0054667 A1 | 2/2017 | Brown et al. |
| 2017/0346772 A1 | 11/2017 | Albouyeh et al. |
| 2018/0040303 A1 | 2/2018 | Lin et al. |
| 2018/0091613 A1 | 3/2018 | Goel et al. |
| 2018/0113585 A1 | 4/2018 | Shah |
| 2018/0181378 A1 | 6/2018 | Bakman |
| 2018/0232441 A1 | 8/2018 | Lin et al. |
| 2018/0239495 A1 | 8/2018 | Sharifi et al. |

| | | | |
|---|---|---|---|
| 2019/0089660 A1 | 3/2019 | Bellegarda | |
| 2019/0146474 A1 | 5/2019 | Cella et al. | |
| 2019/0146650 A1 | 5/2019 | Shah | |
| 2019/0187874 A1 | 6/2019 | Canfield et al. | |
| 2020/0026352 A1 | 1/2020 | Wang et al. | |
| 2020/0053208 A1 | 2/2020 | Kats et al. | |
| 2020/0233898 A1 | 7/2020 | Barzelay et al. | |
| 2020/0236081 A1 | 7/2020 | Lukas et al. | |
| 2021/0342785 A1 | 11/2021 | Mann et al. | |
| 2022/0044321 A1 | 2/2022 | Monahan et al. | |
| 2022/0158962 A1 | 5/2022 | Antonov et al. | |
| 2022/0179665 A1 | 6/2022 | Rathod | |
| 2022/0236857 A1 | 7/2022 | Sharifi et al. | |
| 2022/0263822 A1 | 8/2022 | Zager et al. | |
| 2022/0377041 A1 | 11/2022 | Lukas et al. | |
| 2022/0394005 A1 | 12/2022 | Mehta et al. | |
| 2024/0176960 A1 | 5/2024 | Maurer et al. | |
| 2024/0177119 A1 | 5/2024 | Bhatia | |
| 2024/0362826 A1 | 10/2024 | Wang et al. | |
| 2025/0053735 A1* | 2/2025 | Shevchenko | G06F 40/30 |
| 2025/0165068 A1 | 5/2025 | Kim et al. | |
| 2025/0175694 A1 | 5/2025 | Xu et al. | |
| 2025/0274407 A1 | 8/2025 | Lambert | |
| 2025/0274409 A1* | 8/2025 | Rieffel | H04L 51/226 |

FOREIGN PATENT DOCUMENTS

| | | | |
|---|---|---|---|
| EP | 1464014 | A1 | 10/2004 |
| EP | 1717743 | A1 | 11/2006 |
| EP | 1774708 | A1 | 4/2007 |
| EP | 2610812 | B1 | 7/2015 |
| FR | 3026504 | A1 | 4/2016 |
| JP | 2006350772 | A | 12/2006 |
| KR | 20060058903 | A | 6/2006 |
| KR | 20070057570 | A | 6/2007 |
| WO | 03060772 | A1 | 7/2003 |
| WO | 2007137323 | A2 | 12/2007 |
| WO | 2019212726 | A1 | 11/2019 |

OTHER PUBLICATIONS

Panimalar et al., "A Review of Churn Prediction Models Using Different Machine Learning and Deep Learning Approaches in Cloud Environment", Journal of Current Science and Technology, Jan.-Apr. 2023, vol. 13(1), pp. 136-161.

Goel, Ajay. "How to Create Folders in Gmail (Step-by-Step Guide)." GMass Blog, Oct. 30, 2021, www.gmass.co/blog/how-to-create-folders-in-gmail/. Accessed Apr. 3, 2026. (Year: 2021).

Heath, Catherine. "Get Organized with Gmail Labels." Keeping, Jun. 9, 2022, www.keeping.com/content/gmail-labels/. Accessed Apr. 3, 2026. (Year: 2022).

Kidson, Russell. "Organize Your Inbox with Gmail Color-Coded Labels." Softonic, Softonic EN, Jun. 14, 2024, en.softonic.com/articles/gmail-color-coded-labels. Accessed Apr. 3, 2026. (Year: 2024).

Naha, Priya. "Gmail Labels: A Guide to Keep Your Inbox Organized." ControlHippo, Jul. 9, 2024, controlhippo.com/blog/email/gmail-labels/. Accessed Apr. 3, 2026. (Year: 2024).

* cited by examiner

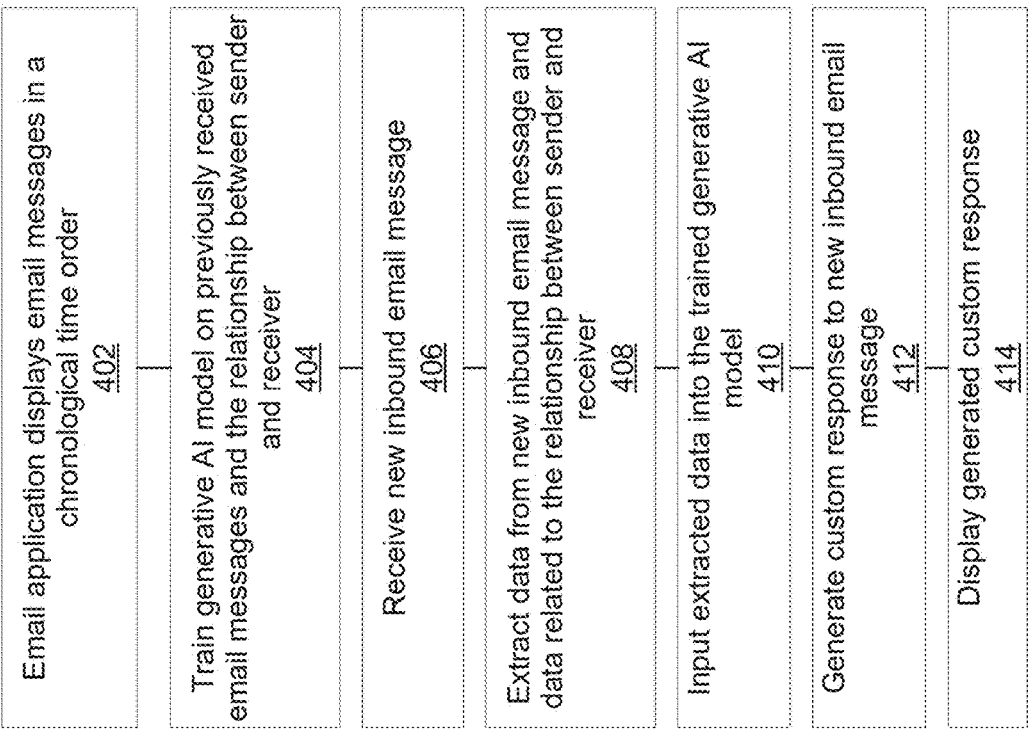

Email application displays email messages in a chronological time order
402

Train generative AI model on previously received email messages and the relationship between sender and receiver
404

Receive new inbound email message
406

Extract data from new inbound email message and data related to the relationship between sender and receiver
408

Input extracted data into the trained generative AI model
410

Generate custom response to new inbound email message
412

Display generated custom response
414

*FIG. 4*

GENERATIVE ARTIFICIAL INTELLIGENCE EMAIL CLIENT WITH SENDER CENTRIC CAPABILITIES IN AN IMMERSIVE ENVIRONMENT

CROSS-REFERENCE TO RELATED APPLICATION

This application is a continuation application of U.S. patent application Ser. No. 18/585,966, filed Feb. 23, 2024, which is incorporated herein by reference in its entirety.

BACKGROUND

Electronic mail (email or e-mail) includes a method of transmitting and receiving messages using electronic devices. Email operates across computer networks, primarily the internet, and also local area networks. Email servers accept, forward, deliver, and store email messages. Email messages generally include two sections: "header" and "body." These are known as "content." The header is structured into fields such as From, To, CC, Subject, Date, and other information about the email.

An email client, email reader or, more formally, message user agent or mail user agent is a computer program that resided on a device and is used to access and manage a user's email. For example, small portable devices like smartphones are increasingly used to check email while traveling and to make brief replies. Larger devices with better keyboard access are used to reply at greater length. A web application which provides message management, composition, and reception functions can act as a web email client, and a piece of computer hardware or software whose primary or most visible role is to work as an email client can also use the term.

BRIEF DESCRIPTION OF THE DRAWINGS

Detailed descriptions of implementations of the present invention will be described and explained through the use of the accompanying drawings.

FIG. 4 is a flowchart of an embodiment of a process for generating a custom email response for a particular sender in an email application.

Figure 1:
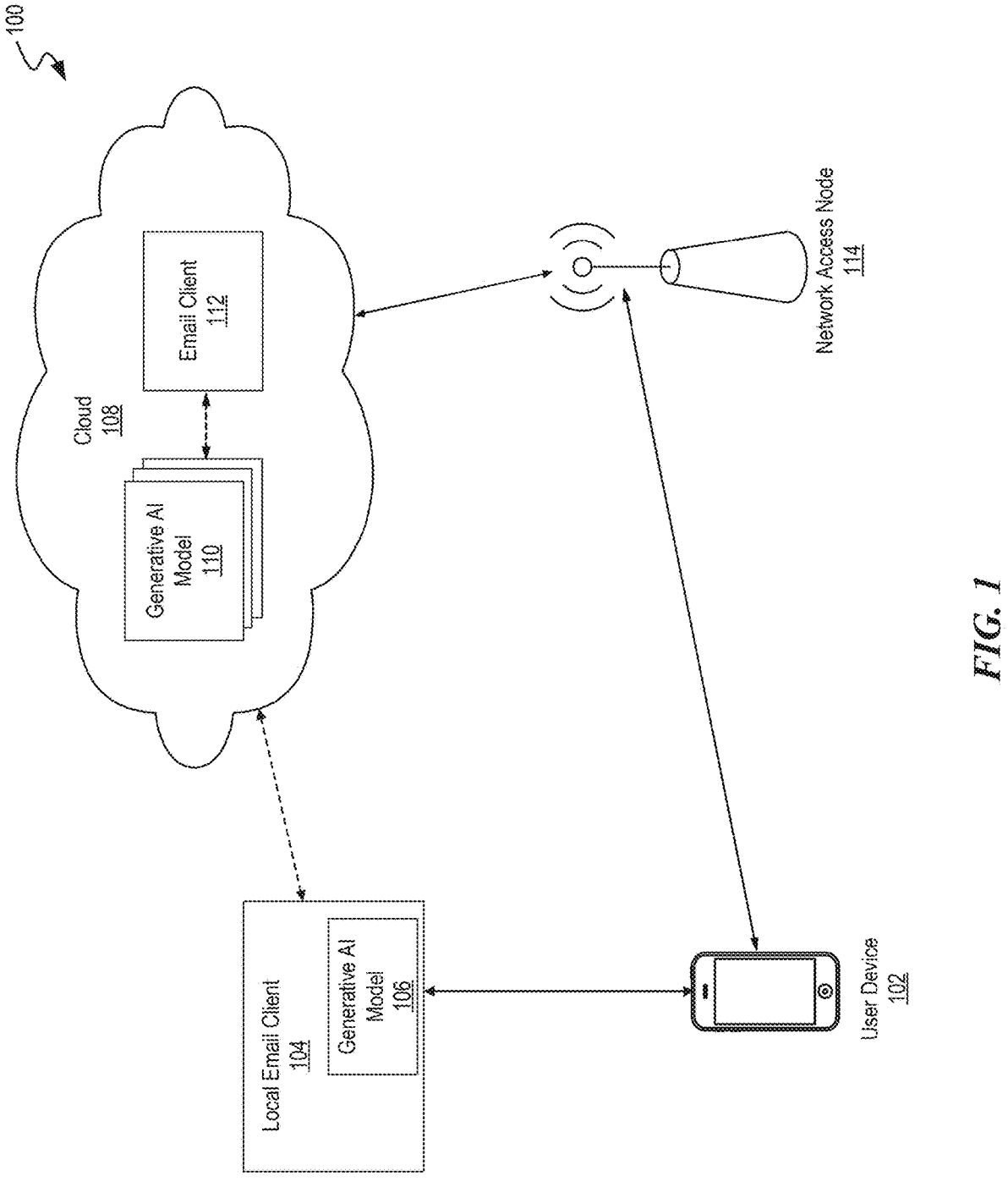
FIG. 1 is a block diagram that illustrates an example email communication system with an email client configured to use a generative artificial intelligence (AI) model.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The present technology provides methods and systems for enhanced email communication. An aspect of the technology enables a user who is the recipient of a new inbound email to receive content to be used as a response to the new inbound email. The content can be generated by an artificial intelligence (AI) system (e.g., a generative AI system including a large language model (LLM)). The content is generated based on data from the email client (e.g., sender-specific data and data used to determine a relationship between the sender and a receiver). The generated content is then displayed within the email client.

Email Communication System

FIG. 1 is a block diagram that illustrates an example email communication system 100 with an email client configured to use a generative AI model. The system 100 includes an email client that has been enabled for a user device 102. In some embodiments, the email client 112 is managed and administered by a cloud network 108. An email client can run on the cloud network 108 as email client 112, locally on the user device 102 as a local email client 104, or as a combination of local and cloud processes. In some embodiments, the user device 102 communicates with the cloud network via network access node 114.

The email client 112 is configured to function with a generative AI model 110. The generative AI model 110 can be a LLM used for the purpose of natural language processing, text generation, and sentiment analysis. In some embodiments, the generative AI model 110 outputs generated responses in response to a new inbound email received from the email client 112.

The local email client 104 includes a generative AI model 106. In some embodiments, the generative AI model 106 can be a LLM used for the purpose of natural language processing, text generation, and sentiment analysis. In further embodiments, the generative AI model 106 outputs generated responses in response to a new inbound email received from the local email client 104.

Transformer for Neural Network

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks, and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification, etc.) in order to improve the accuracy of outputs (e.g., more accurate predictions) for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a "language model"), the training dataset may be a collection of text documents, referred to as a "text corpus" (or simply referred to as a "corpus"). The corpus may represent a language domain (e.g., a single language), a subject domain (e.g., scientific papers), and/or may encompass another domain or domains, be they larger or smaller than a single language or subject domain. For example, a relatively large, multilingual, and non-subject-specific corpus can be created by extracting text from online web pages and/or publicly available social media posts. Training data can be annotated with ground truth labels (e.g., each data entry in the training dataset can be paired with a label) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data can be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters can be determined based on the measured performance of one or more of the trained ML models, and the first step of training (e.g., with the training set) may begin again on a different ML model described by the new set of determined hyperparameters. In this way, these steps can be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (e.g., update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (e.g., "learn") the parameters to reduce the loss function. Backpropagation is performed iteratively so that the loss function is converged or minimized. Other techniques for learning the parameters of the ML model can be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters can then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to an ML-based language model, there could exist non-ML language models. In the present disclosure, the term "language model" can refer to an ML-based language model (e.g., a language model that is implemented using a neural network or other ML architecture), unless stated otherwise. For example, unless stated otherwise, the "language model" encompasses LLMs.

A language model can use a neural network (typically a DNN) to perform natural language processing (NLP) tasks. A language model can be trained to model how words relate to each other in a textual sequence, based on probabilities. A language model may contain hundreds of thousands of learned parameters or, in the case of an LLM, can contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

A type of neural network architecture, referred to as a "transformer," can be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent RNN-based language models.

Figure 2:
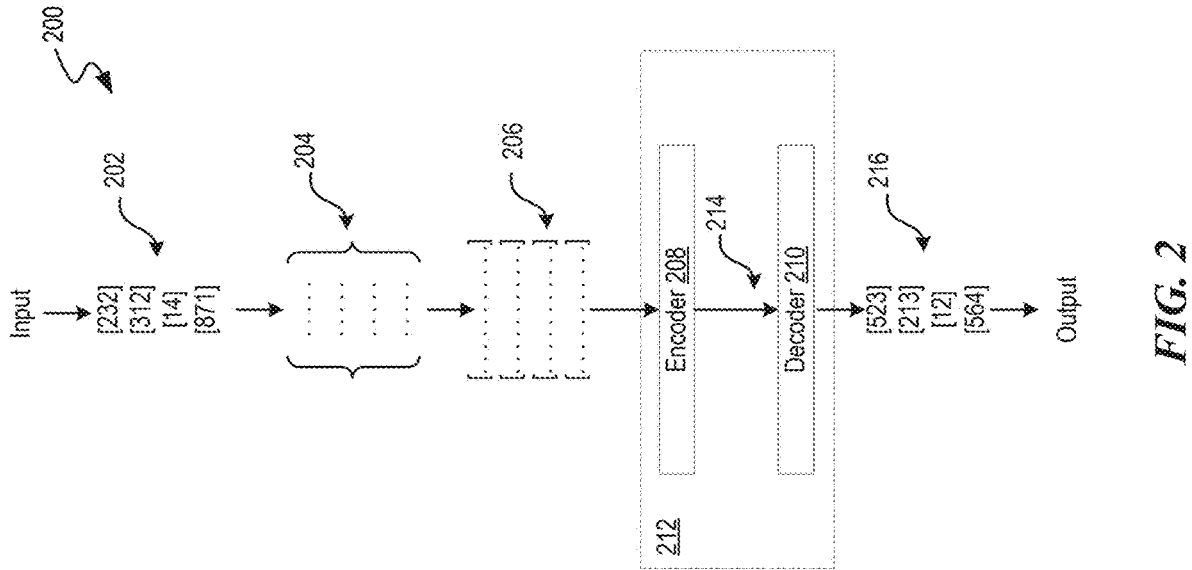
FIG. 2 is a block diagram of a transformer neural network, which may be used in examples of the present disclosure.

FIG. 2 is a block diagram of an example transformer 212. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure may be applicable to any ML-based language model, including language models based on other neural network architectures such as RNN-based language models.

The transformer 212 includes an encoder 208 (which can include one or more encoder layers/blocks connected in series) and a decoder 210 (which can include one or more decoder layers/blocks connected in series). Generally, the encoder 208 and the decoder 210 each include multiple neural network layers, at least one of which can be a self-attention layer. The parameters of the neural network layers can be referred to as the parameters of the language model.

The transformer 212 can be trained to perform certain functions on a natural language input. Examples of the functions include summarizing existing content, brainstorming ideas, writing a rough draft, fixing spelling and grammar, and translating content. Summarizing can include extracting key points or themes from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 212 is trained to perform certain functions on other input formats than natural language input. For example, the input can include objects, images, audio content, or video content, or a combination thereof.

The transformer 212 can be trained on a text corpus that is labeled (e.g., annotated to indicate verbs, nouns) or unlabeled. LLMs can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input).

Figures 3A, 3B:
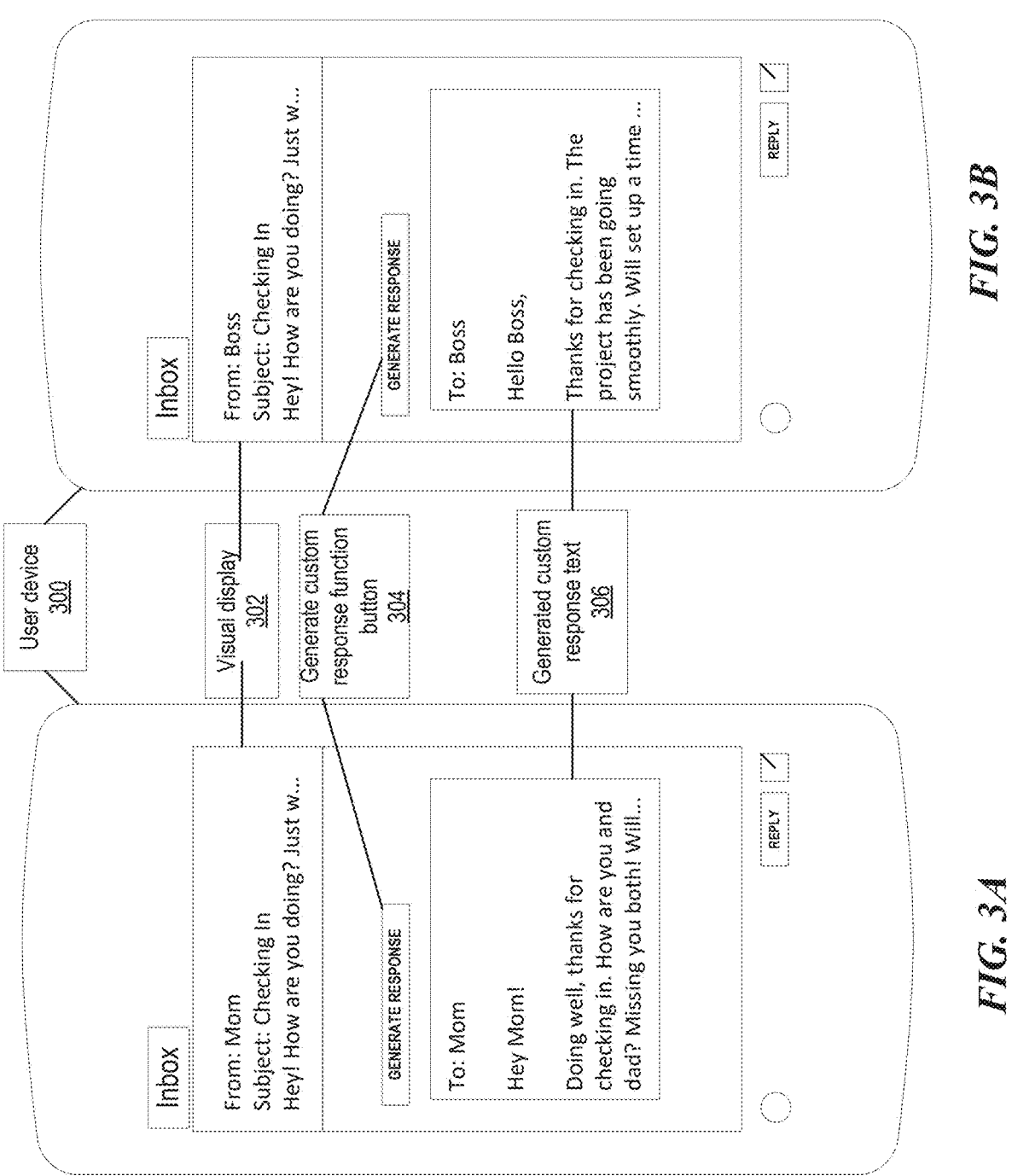
FIGS. 3A and 3B are exemplary views of an email application that incorporates generative AI to generate custom sender-centric responses.

FIGS. 3A and 3B are exemplary views of an email application that incorporates generative AI to generate custom sender-centric responses. A user device 300, such as a mobile phone, enables a user to receive and send emails using an email application. The email application displays the received sender, subject line, and content of an inbound email on a visual display 302 of the user device 300. FIGS. 3A and 3B illustrate an embodiment where a generate custom response function button 304 is located within the response composition area within the email application. When the receiver selects the generate custom response function button 304 using the user device 300, the email application displays generated custom response text 306 in response to the inbound email on the visual display 302.

The email application displays different generated custom response text 306 in response to emails that have the same inbound email content but different senders. For example, in FIGS. 3A and 3B, the content of the inbound email on visual display 302 is the same but has a different generated custom response text 306 that is specific to each sender.

In FIG. 3A, visual display 302 displays an email from a sender with the relationship of "Mom" and a subject of "Checking In." The visual display 302 also displays a portion of the email body, "Hey! How are you doing? Just w . . . " Generated custom response text 306 is generated by selecting the generate custom response function button 304. The generated custom response text 306, "Hey Mom! Doing well, thanks for checking in. How are you and dad? Missing you both! Will . . . " is reflective of the relationship between the sender "Mom" and the recipient.

In FIG. 3B, visual display 302 displays an email from a sender with the relationship of "Boss" and the same subject of "Checking In." The visual display 302 also displays the same portion of the email body, "Hey! How are you doing? Just w . . . " Generated custom response text 306 is generated by selecting the generate custom response function button 304. The generated custom response text 306, "Hello Boss, Thanks for checking in. The project has been going smoothly. Will set up a time . . . " is similarly reflective of the relationship between the sender "Boss" and the recipient.

The same messages are received in FIGS. 3A and 3B, but different responses are generated in reply.

FIG. 4 is a flowchart of an embodiment of a process 400 for generating a custom email response for a particular sender in an email application. In one example, the process can be performed on a system including an electronic user device with an email client coupled with an AI model, enabled through a cloud network system.

At 402, the system can cause display of a graphical display on a display of a user device, the graphical display being associated with multiple email messages, each email message of the multiple email messages containing data that is specific to a sender of the email message and being associated with data used to determine a relationship between the sender and a receiver of the email message. A relationship defines the way that the sender and a receiver are connected. A relationship can be a first-time or unknown relationship between a sender and receiver who are corresponding for the first time. A relationship can also be longstanding with previous emails and interactions between a sender and receiver. Other information available to the receiver about the sender can also be used to determine the relationship between the sender and receiver. In one example, the system can also cause display of multiple message elements in a list on the display of the user device, the multiple message elements having a chronological time order and each message element representing an email message. For example, an email client can display a user's email inbox, the email inbox containing the list of inbound emails received by the user in descending chronological order.

In another example, the system can be a virtual reality system, and the graphical display is displayed through a mixed reality interface. The virtual reality system can communicatively couple the user device with a head-mounted display (HMD) device and detect motion-based gestures by the user relative to the mixed reality interface. For example, a user can use a virtual reality (VR)/augmented reality (AR) headset to view, move, delete, and compose email messages.

At 404, the system can extract the data specific to the sender and the data used to determine a relationship between the sender and the receiver to be used as input to a generative AI model, wherein the generative AI model is specific to the receiver. In one example, the system can identify the sender as a first-time sender to the receiver and define the relationship between the first-time sender and the receiver as an unknown relationship. In another example, the system can identify the sender as a known sender to the receiver and determine the relationship between the known sender and the receiver as a known relationship. In yet another example, the system can create a sender profile for a particular sender, where the sender profile is customizable and includes data specific to the particular sender and data used to determine a relationship between the sender and the receiver. In another example, the data included in the sender profile can be used as input to the generative AI model.

At 406, the generative AI model can be trained based on previously received email messages from specific senders and the relationship between the senders and the receiver. In one example, the system can generate, by the trained generative AI model, a custom graphical display of a particular email message and email messages received from a particular sender on the user device. In one example, this graphical display is customizable by the receiver, and the customizable graphical display is not dependent on the content of the particular email message and the content of the email messages received by the particular sender. For example, the user can customize the background of emails received from a particular sender to have a specific design or be a specific color. In another example, the user can customize the font of emails received from a particular sender.

At 408, the system can receive a new inbound email message from the sender. At 410, the system can input the data specific to the sender, the data used to determine a relationship between the sender and the receiver, and content of the new inbound email message into the generative AI model. For example, the content of the new inbound email message can include the email subject line, the message text from the body of the email, and the sender's profile information.

At 412, the system can generate, by the trained generative AI model, a custom response to a new inbound email message that is specific to the content of the new inbound email message, the sender, and the relationship between the sender and the receiver. For example, an email message from a sender with the relationship of "son" compared to an email message from a sender with the relationship of "sister" compared to an email message from a sender with the relationship of "coworker." In one example, the system can identify the sender as a first-time sender to the receiver and generate the custom response based on information provided by the first-time sender and the content of the email message from the first-time sender. In one example, the system can identify the sender as a known sender and generate the custom response based on content of previous email messages between the sender and the receiver. In another example, the system can generate a custom response to the new inbound email message by querying previously received email messages for content related to the new inbound email message and including the related content within the custom response to the new inbound email message.

At 414, the system can display the generated custom response to the receiver on the display of the user device upon access of the new inbound email message. In one example, the display of the generated custom response to the receiver is presented in an editable format that allows the receiver to make edits to the generated custom response. For example, the generated custom response can be displayed within an editable text box where the user can edit generated text, delete generated text, or add their own text. In one example, the system can further store data associated with the edits made by the receiver to the generated custom response and input the data associated with the edits made by the receiver to the generated custom response into the generative AI model to further train the generative AI model specific to the receiver using the data associated with the edits made by the receiver. In another example, the system can generate a summary of a particular email message from the multiple email messages and display the summary of the particular email message to the receiver. In one example, a particular email message of the multiple email messages can be associated with more than one additional email message as part of an email message chain. The email message chain can be associated with multiple senders, and the generative AI model can take the combined content from the email message chain as input. In yet another example, the system can generate a summary of a particular email message chain as an output of the generative AI model and display the summary of the particular email message chain to the receiver.

Computer System

Figure 5:
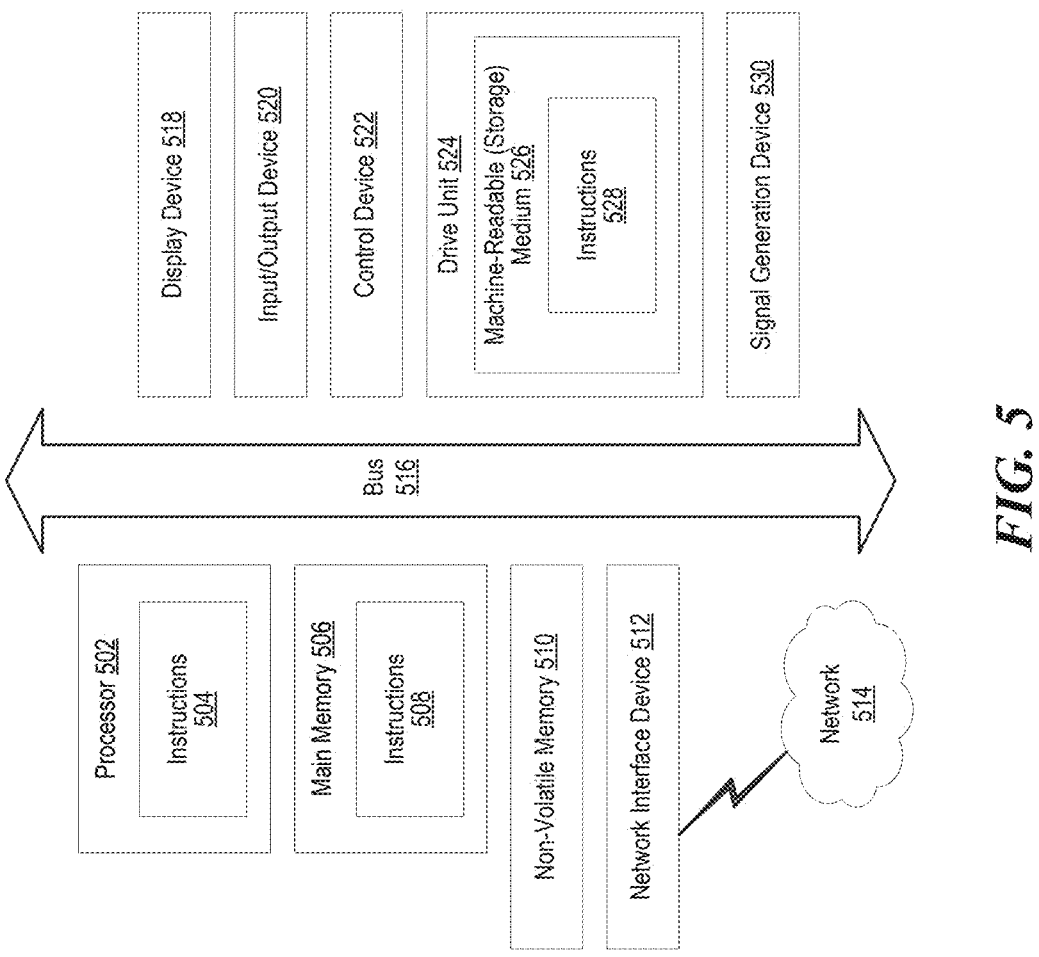
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, video display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementations, the computer system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real time, near real time, or in batch mode.

Mixed Reality System

As described herein, "mixed reality" can take place in the physical world and/or virtual world, such as a hybrid of AR and virtual reality VR. In particular, AR is an interactive experience of the real-world environment where objects that reside in the real world are enhanced by computer-generated perceptual information, sometimes across multiple sensory modalities, including visual, auditory, haptic, somatosensory, or olfactory. AR can be defined as a system that incorporates three basic features: a combination of real and virtual worlds, real-time interaction, and accurate 3D registration of virtual and real objects.

Figure 6:
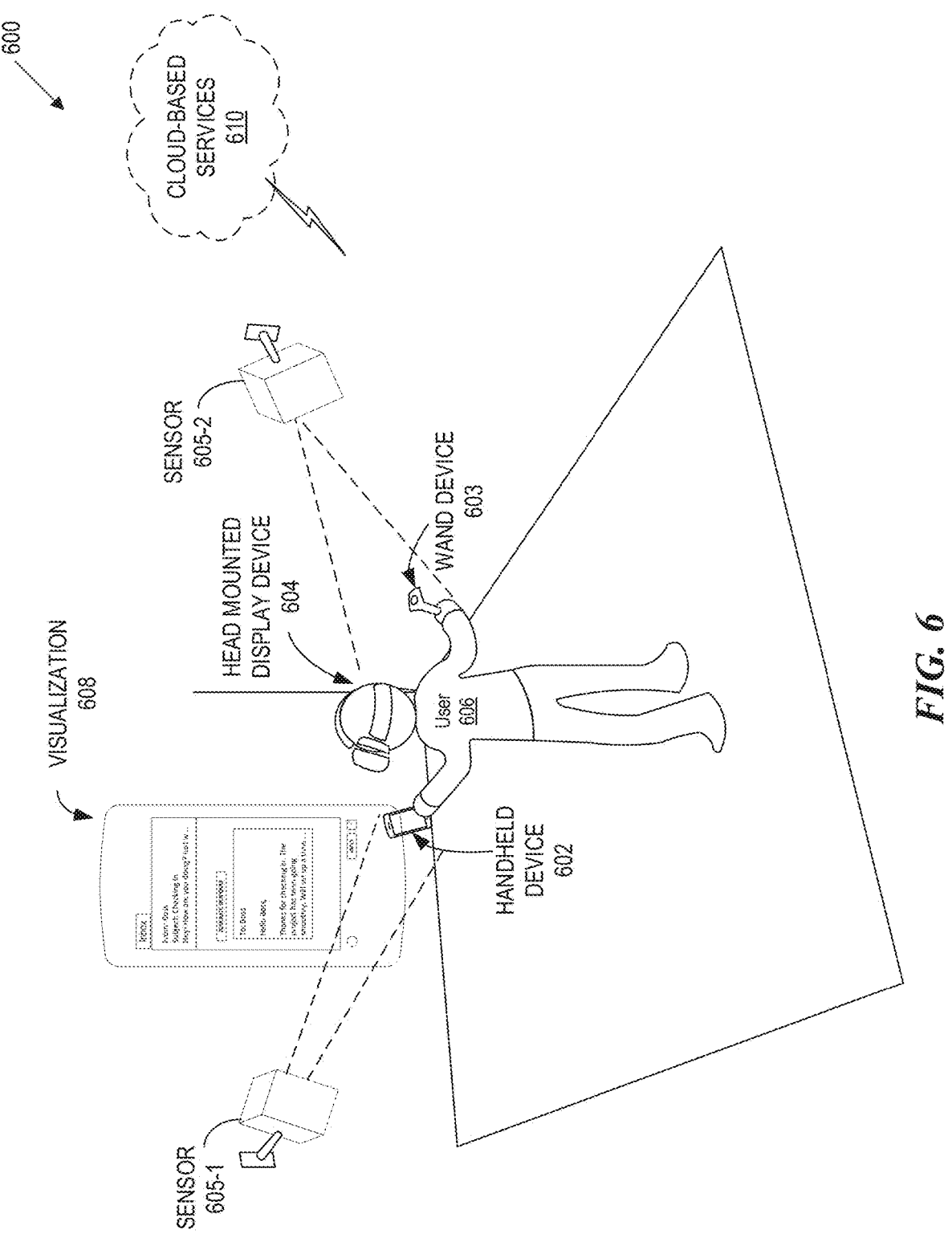
FIG. 6 illustrates an embodiment of a user engaged with an email application through a mixed reality system.

FIG. 6 illustrates a user engaged with a mixed reality system 600 for immersive message management. The components of the system 600 can include a handheld device 602 that administers a session running on other components of the system 600 including an HMD device 604 (e.g., partial or full 360 degree horizontal interfaces). The system 600 can also include motion or position sensors 605-1 and 605-2 that are stationary or worn by the user 606 such as, for example, sensors of wearables. As illustrated, the handheld device 602 operates as a wand to navigate objects of the visualization 608 experienced by the user 606 through the HMD device 604. A dedicated wand device 603 (e.g., with one or more dedicated hardware buttons) can additionally or alternatively be used for navigation. In another example, the sensors 605-1 and 605-2 can detect the position and/or movement of the user 606's finger in the air to perform the functions including the examples illustrated in FIGS. 3A and 3B, which could be rendered in a mixed reality session like on the handheld device 602.

In some embodiments, some components of the system 600 are remotely located from the user. For example, cloud components can provide cloud-based services 610 to administer the mixed-reality session running on the components of the system 600 or provide services or content for a mixed reality session. Hence, administration of a mixed reality session could be through the HMD device 604, augmented with the handheld device 602, and/or with the cloud system 610 that receives session progress feedback (e.g., anywhere outside of room where the user is experiencing a simulation).

As shown, the HMD device 604 can provide content (e.g., visualization 608) of a mixed-reality session and process feedback from the user via the handheld device 602 to navigate the visualization 608. As shown, the HMD device 604 is a near-to-eye display system that is worn by the user 606. For example, the HMD device 604 can have a chassis and various electrical and optical components to enable an immersive experience by the user 606 wearing the HMD device 604. For example, the HMD device 604 can include a display for each of the user's eyes. The displays can render a real-world scene of a simulation for view by the user's eyes when the HMD device 604 is worn by the user. The HMD device 604 can also include a camera mounted to the chassis. The camera can capture movement of the user's pupils for physiological feedback responsive to simulated scenes being rendered. The HMD device 604 may also include a network interface enabling the handheld device 602 to communicatively couple to the HMD device 604 over a wireless connection.

In some embodiments, the HMD device 604 includes features for measuring the user's physiological activity. For example, the HMD device 604 can include components to measure the user's electrical brain activity. As such, the HMD device 604 can collect physiological data in combination with any direct input by the user. In some embodiments, the physiological data can be used to supplement the user's conscious inputs. In some embodiments, the physiological data could be used to compare against the user's conscious input.

In one example, the HMD device 604 can render a virtual immersive environment by displaying images in view of the user's eyes such that the user can only see the images (e.g., visualization 608) and see nothing of the real-world. The HMD device 604 can also render an AR environment. As such, the user can see the visualization 608 overlying on the real world while the HMD device 604 is worn by the user 606. Hence, to achieve an AR environment, the user in an augmented reality simulation has a transparent view with digital objects overlaid or superimposed on the user's real-world view.

Examples of the sensors 605-1 and 605-2 include cameras or motion detectors that are positioned proximate to the user such that the sensors 605-1 and 605-2 can obtain real-world feedback responsive to interactions with a simulated real-world scene. For example, cameras facing the user can detect the user 606's movement while the user is engaged in a simulation and provide feedback to the HMD device 604 administering the simulation. The handheld device 602 can be used by the user 606 to submit input, which can include actuating buttons for the user 606 to input data and/or accelerometers that detect spatial movement. For example, the user 606 can move the handheld device 602 to provide inputs responsive to a scene administered by the HMD device 604.

The visualization 608 is one example of many that can be rendered in a mixed-reality session. FIGS. 3A and 3B show examples of visualizations that could likewise be rendered in a mixed reality session. The user 606 can select and move objects of the visualization 608 in a manner described with respect to FIGS. 3A and 3B. As described further below, the system 600 can include servers that are remotely located from the user 606 and can access a program administered by the HMD device 604. Further, a local software generation and distribution framework can be used to rapidly scale content. The core components and services can support complex user and session elements that can be easily managed by a service provider. As such, a platform of a mixed reality system can standardize interaction elements such as a session landing, sign-in, navigation rules, and the like. A top-level abstraction layer can support customization such as a sequence of sessions or scenes or conditional ordering of sessions or scenes. Services can include authentication, tracking, reports, user services, help services, pause and resume services, and the like.

Figure 7:
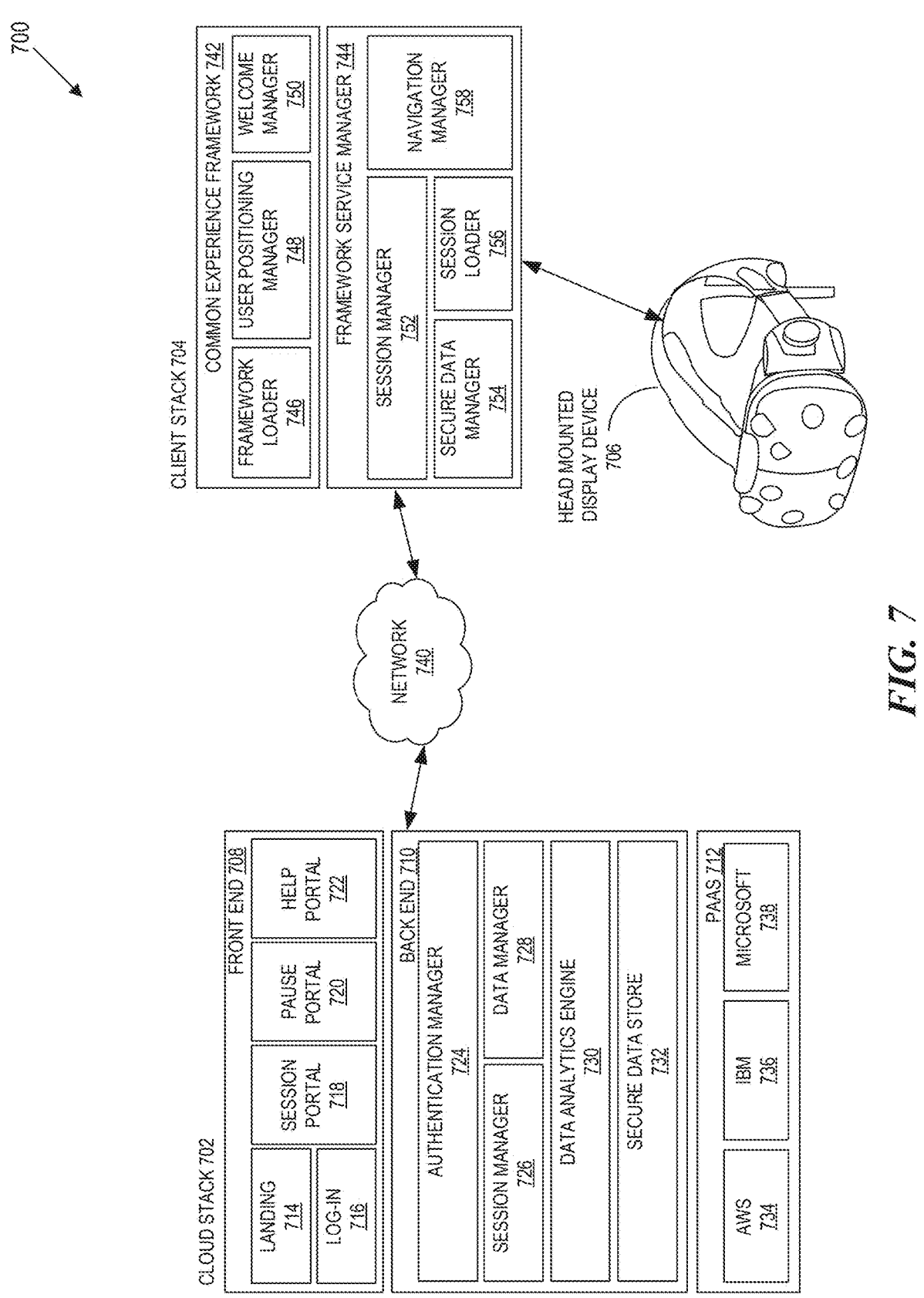
FIG. 7 is a block diagram of an embodiment illustrating stacks of a mixed reality platform that can collectively administer a session on a near-to-eye display system.

FIG. 7 is a block diagram illustrating a cloud stack 702 and a client stack 704 architecture for a platform 700 that can collectively administer a mixed reality session on an HMD device 706. As shown, the cloud stack 702 includes three primary layers: a frontend layer 708, a back-end layer 710, and a platform as a service (PaaS) layer 712. The frontend layer 708 includes a landing component 714 and a log-in component 716. The two components 714 and 716 are executed at the beginning of a session administered to orient a user and seek login credentials to control access to message programs and user information of the platform 700. The frontend layer 708 also includes a session portal 718, pause portal 720, and help portal 722. The session portal 718 is for normal front-facing operations of a simulation session whereas the pause portal 720 is for operations while the session is paused. Lastly, the help portal 722 can help the user or administrator to address questions related to the platform 700 or simulation.

The back-end layer 710 includes an authentication manager 724 that can authenticate a user and/or an administrator of the platform 700. A session manager 726 can manage access to a particular session. A data manager 728 can manage user data and/or data about the session such as any feedback from users while engaged in sessions. For example, the data manager 728 can collect feedback data from multiple users including their inputs and physiological data. A data analytics engine 730 can process the collected data to determine the actions of users and to learn how to improve the sessions (e.g., mixed reality scenes). A secure data store 732 can store sensitive data such as data that identifies users. Lastly, the PaaS layer 712 includes cloud computing services that provide the platform 700 for clients to administer the mixed reality sessions. Examples include AMAZON WEB SERVICES (AWS) 734, or services provided by IBM 736 and/or MICROSOFT 738.

The cloud stack 702 is communicatively connected to the client stack 704 over a network 740 such as the internet. The client stack 704 includes a common experience framework layer 742 and a framework service manager layer 744. The common experience framework layer 742 includes a framework loader 746 to load the framework for a session, a user positioning manager 748 to monitor and track the relative position of the user engaged with the session, and a welcome manager 750 to orient the user at the beginning of the session.

The framework service manager layer 744 includes a session manager 752 to manage the session experienced by a user wearing the HMD device 706. The framework service manager layer 744 also includes a secure data manager 754 to store or anonymize any sensitive data, session load manager 756 for loading a session, and a navigation manager 758 for navigating a user through mixed reality scenes of a message management program. The platform 700 is merely illustrative to aid the reader in understanding an embodiment. Other embodiments may include fewer or additional layers/components known to persons skilled in the art but omitted for brevity.

REMARKS

The terms "example," "embodiment," and "implementation" are used interchangeably. For example, reference to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to.:" Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms in either this application or in a continuing application.

I claim:

1. A non-transitory, computer-readable storage medium storing instructions that, when executed by at least one data processor of a mixed reality system, cause the mixed reality system to:

cause display of multiple virtual elements of respective email messages in a mixed reality interface, wherein each email message identifies a particular sender and is associated with data indicative of a particular relationship between the particular sender and a receiver of the email message;

determine, based on input of content of a first new inbound email message from a first sender into a generative artificial intelligence (AI) model, that a relationship between the first sender and the receiver is of a first type, wherein the generative AI model is trained based on data specific to one or more senders and the data indicative of respective relationships between the one or more senders and the receiver;

in response to detection of a motion-based gesture relative to the mixed reality interface:

generate, by the generative AI model, a first custom response to the first new inbound email message, wherein the first custom response is responsive to content of the first new inbound email message, and a relationship between the first sender and the receiver being of the first type;

cause display, in the mixed reality interface, of a first new virtual element for the first new inbound email message and the first generated custom response in the mixed reality interface;

determine, based on input of content of a second new inbound email message from a second sender into the generative AI model, that a relationship between the second sender and the receiver is of a second type different from the first type, wherein a second custom response to the second inbound email message is generated responsive to the second new inbound email message and the relationship between the second sender and the receiver being of the second type; and cause display, in the mixed reality interface, of a second new virtual element for the second new inbound email message and the second generated custom response in the mixed reality interface.

2. The non-transitory, computer-readable storage medium of claim 1, wherein the mixed reality system is further caused to:

cause display of the multiple virtual elements in the mixed reality interface to a user wearing a head-mounted display (HMD) device;

identify the user as the receiver of the first new inbound email message;

determine that the first sender is a first-time sender to the receiver;

define the first type of relationship between the first-time sender and the receiver as an unknown relationship, wherein the first generated custom response is based on information provided by the first-time sender and the content of the first new inbound email message from the first-time sender; and cause display of the first generated custom response at the HMD device.

3. The non-transitory, computer-readable storage medium of claim 1, wherein the mixed reality system is further caused to:

cause display of the multiple virtual elements in the mixed reality interface to a user wearing a head-mounted display (HMD) device;

identify the user as the receiver of the first new inbound email message;

determine that the first sender is a known sender to the receiver;

determine the first type of relationship between the known sender and the receiver as a known relationship, wherein the first custom response is generated based on previous email messages between the first sender and the receiver; and cause display of the first generated custom response at the HMD device.

4. The non-transitory, computer-readable storage medium of claim 1, wherein the mixed reality system is further caused to:

in response to detection of a motion-based gesture to select a virtual element of a particular email message through the mixed reality interface:

generate, by the generative AI model, a summary of the particular email message; and cause display of the summary of the particular email message to a user wearing a head-mounted display (HMD) device.

5. The non-transitory, computer-readable storage medium of claim 4, wherein the mixed reality system is further caused to:

generate a summary of a chain of email messages as an output of the generative AI model; and cause display of the summary of the chain of email messages to a user wearing a head-mounted display (HMD) device.

6. The non-transitory, computer-readable storage medium of claim 1, wherein the mixed reality system is further caused to:

generate, by the generative AI model, a common mixed reality display for all email messages received from a specific sender, wherein the common mixed reality display is customizable by the receiver and independent of content of a particular email message of all the email messages received from the specific sender.

7. The non-transitory, computer-readable storage medium of claim 1, wherein the mixed reality system is further caused to:

create a sender profile for a specific sender, the sender profile being customizable by the specific sender or the receiver, wherein the sender profile includes data specific to the specific sender and data used to determine a relationship between the specific sender and the receiver, and wherein the sender profile is input to the generative AI model to generate custom responses to email messages from the specific sender.

8. The non-transitory, computer-readable storage medium of claim 1, wherein the mixed reality system is further caused to:

cause display of a generated custom response as an editable custom response in the mixed reality interface, wherein the editable custom response includes a combination of editable elements, in response to detection of a motion-based gesture to select an editable element of the editable custom response;

animate, through the mixed reality interface, a change to the editable custom response; and cause display, on the mixed reality interface, of an edited version of the editable custom response.

9. The non-transitory, computer-readable storage medium of claim 8, wherein the mixed reality system is further caused to:

store data associated with edits made to the editable custom response; and retrain the generative AI model with the data associated with the edits made by to the editable custom response.

10. A mixed reality system comprising:

a head-mounted display (HMD) device;

a data processor; and a memory storing instructions that, when executed by the data processor, cause the mixed reality system to:

cause the HMD device to render a mixed reality interface including multiple virtual elements of respective email messages, each email message containing data that identifies a particular sender of the email message and being associated with data used to determine a particular relationship between the particular sender and a receiver of the email message;

in response to detection of a motion-based gesture of a user wearing the HMD device, generate, by a generative artificial intelligence (AI) model, a first custom response to a first new inbound email message, wherein the first custom response is responsive to content of the first new inbound email message and a first type of relationship between the first sender and the receiver, and wherein a second custom response is generated responsive to content of a second new email message and a second type of relationship between a second sender and the receiver, the second type of relationship being different from the first type of relationship; and cause display of the first generated custom response and of the second generated custom response to the user of the HMD device.

11. The mixed reality system of claim 10 further caused to:

identify the user wearing the HMD device as the receiver of the first new inbound email message;

identify the first sender as a first-time sender to the receiver; and define the first type of relationship between the first-time sender and the receiver as an unknown relationship, wherein the first generated custom response is based on information provided by the first-time sender and the content of the email message from the first-time sender.

12. The mixed reality system of claim 10 further caused to:

identify the user wearing the HMD device as the receiver of the first new inbound email message;

identify the first sender as a known sender to the receiver;

determine the first type of relationship between the known sender and the receiver as a known relationship; and generate the first custom response based on content of previous email messages communicated between the known sender and the receiver.

13. The mixed reality system of claim 10 further caused to:

generate a summary of a particular email message from the multiple email messages; and cause display of the summary of the particular email message at the HMD device.

14. The mixed reality system of claim 10 further caused to:

generate a summary of a chain of email messages as an output of the generative AI model; and cause a mixed reality display of the summary of the chain of email messages at the HMD device.

15. The mixed reality system of claim 10 further caused to:

customize all email messages from a specific sender in a common format designated for the specific sender, wherein the customization is independent of content of the email message.

16. The mixed reality system of claim 10 further caused to:

create a sender profile for a specific sender, the sender profile being customizable by the specific sender or the receiver, wherein the sender profile includes data specific to the specific sender and data used to determine a relationship between the specific sender and the receiver, and wherein the data included in the sender profile is used as input to the generative AI model to generate custom responses to the specific sender.

17. A method comprising:

causing display of multiple virtual elements of respective email messages in a mixed reality interface, wherein each email message identifies a particular sender and is associated with data indicative of a relationship between the particular sender and a receiver of the email message;

inputting content of an inbound email message into a generative artificial intelligence (AI) model that is trained based on one or more senders and respective relationships between senders and the receiver;

detecting a motion-based gesture relative to the mixed reality interface;

in response to detection of the motion-based gesture, generating, by the generative AI model, a first custom response to the first inbound email message, wherein the first custom response is specific to content of the first inbound email message and a first type of relationship between the first sender and the receiver, wherein a second custom response is generated responsive to content of a second inbound email message and a second type of relationship between a second sender and the receiver, the second type of relationship being different from the first type of relationship; and causing display of the first and second generated custom responses in the mixed reality interface.

18. The method of claim 17 further comprising:

causing display of the first generated custom response on the display of a head mounted display (HMD) device upon access of the first inbound email message, wherein the first generated custom response is presented with editable components that allow for editing the first generated custom response.

19. The method of claim 17, wherein generating the custom response to the first inbound email message further comprises:

querying previously received email messages for content related to the first inbound email message; and including the related content in the first custom response to the first inbound email message.

20. The method of claim 17, wherein the method is performed by a virtual reality system, the method further comprising:

communicatively coupling to a head-mounted display (HMD) device that displays the mixed reality interface; and detecting motion-based gestures relative to the mixed reality interface.

21. A mixed reality system comprising:

a head-mounted display (HMD) device;

a data processor; and a memory storing instructions that, when executed by the data processor, cause the mixed reality system to:

cause the HMD device to render a mixed reality interface including multiple virtual elements of respective messages, each message containing data that identifies a specific sender of the message and being associated with data used to determine a specific relationship between the specific sender and a receiver of the message, wherein the mixed reality interface is superimposed on the user's surrounding real-world environment;

in response to detection of a user action of a user wearing the HMD device, generate, by a generative artificial intelligence (AI) model, a first custom response to a first new inbound message, wherein the first custom response is responsive to content of the first new inbound message and a relationship between the first sender and the receiver being of a first type, and wherein a second custom response is responsive to content of a second new inbound message and a relationship between a second sender and the receiver being of a second type different from the first type; and cause display of the first and second generated custom responses.

22. The mixed reality system of claim 21, wherein the user's surrounding real-world environment is captured by an externally facing camera configured on the HMD device.

23. The mixed reality system of claim 21, wherein the user action includes an eye movement of the user, wherein the HMD device is further configured to:

detect the eye movement of the user with a camera configured with the HMD device to capture movement of the user's pupils.

24. The mixed reality system of claim 21, wherein the user action includes a voice command by the user, wherein the HMD device is further configured to:

detect the user's voice command with a microphone configured with the HMD device to capture audio within a threshold proximity.

25. The mixed reality system of claim 21, wherein the user action includes a motion-based gesture of the user, wherein the HMD device is further configured to:

detect the motion-based gesture of the user with at least one of a camera and a sensor configured with the HMD device.

* * * * *